United States Patent
Liu

(10) Patent No.: US 9,445,349 B1
(45) Date of Patent: Sep. 13, 2016

(54) 802.11AH DUTY CYCLE BASED CHANNEL ACCESS PRIORITIES

(71) Applicant: Marvell International Ltd., Hamilton (BM)

(72) Inventor: Yong Liu, Campbell, CA (US)

(73) Assignee: Marvell International Ltd., Hamilton (BM)

( * ) Notice: Subject to any disclaimer, the term of this patent is extended or adjusted under 35 U.S.C. 154(b) by 505 days.

(21) Appl. No.: 13/955,776

(22) Filed: Jul. 31, 2013

Related U.S. Application Data

(60) Provisional application No. 61/683,385, filed on Aug. 15, 2012, provisional application No. 61/791,827, filed on Mar. 15, 2013.

(51) Int. Cl.
*G06F 15/173* (2006.01)
*H04W 48/02* (2009.01)
*H04L 5/00* (2006.01)

(52) U.S. Cl.
CPC ............ *H04W 48/02* (2013.01); *H04L 5/0076* (2013.01)

(58) Field of Classification Search
None
See application file for complete search history.

(56) References Cited

U.S. PATENT DOCUMENTS

| | | | |
|---|---|---|---|
| 7,599,332 B2 | 10/2009 | Zelst et al. | |
| 7,664,089 B2 | 2/2010 | Zhao | |
| 7,710,930 B2 | 5/2010 | Kwak | |
| 7,742,390 B2 | 6/2010 | Mujtaba | |
| 8,036,241 B2 | 10/2011 | Ji et al. | |
| 8,045,574 B2 | 10/2011 | Sherman et al. | |
| 8,121,108 B2 | 2/2012 | Kwon et al. | |
| 8,144,647 B2 | 3/2012 | Nabar et al. | |
| 8,155,138 B2 | 4/2012 | van Nee | |
| 8,265,061 B1 | 9/2012 | Smith et al. | |
| 8,289,869 B2 | 10/2012 | Sawai | |
| 8,355,389 B2 | 1/2013 | Kasslin et al. | |
| 8,411,699 B2 | 4/2013 | Ohmi | |
| 8,468,615 B2 | 6/2013 | Tremp | |
| 8,526,351 B2 | 9/2013 | Fischer et al. | |
| 8,619,907 B2 | 12/2013 | Mujtaba et al. | |

(Continued)

FOREIGN PATENT DOCUMENTS

| | | |
|---|---|---|
| EP | 1513295 A2 | 3/2005 |
| EP | 1553730 A1 | 7/2005 |

(Continued)

OTHER PUBLICATIONS

Hong et al., "802.11ah Channel Access Improvement". May 14, 2012.*

(Continued)

*Primary Examiner* — Scott B Christensen

(57) ABSTRACT

A system includes an access point and a client station. The access point is configured to control access to a communication channel of a wireless network, define a first power category and at least one second power category, each of the first power category and the at least one second power category having a respective access priority associated with access to the communication channel, and communicate a requirement for assignment to the first power category. The client station is configured to determine whether an operating characteristic of the client station meets the requirement for assignment to the first power category, and transmit, in response to a determination that the operating characteristic meets the requirements, a request to the access point to be assigned to the first power category.

20 Claims, 3 Drawing Sheets

(56) References Cited

U.S. PATENT DOCUMENTS

| | | | |
|---|---|---|---|
| 8,724,720 B2 | 5/2014 | Srinivasa et al. | |
| 8,867,653 B2 | 10/2014 | Zhang et al. | |
| 8,995,367 B2 | 3/2015 | Liu | |
| 9,155,027 B1 | 10/2015 | Liu | |
| 9,204,371 B2 | 12/2015 | Liu | |
| 2003/0012163 A1 | 1/2003 | Cafarelli et al. | |
| 2004/0203979 A1 | 10/2004 | Attar et al. | |
| 2004/0218555 A1 | 11/2004 | Chen et al. | |
| 2005/0047386 A1 | 3/2005 | Yi | |
| 2005/0105504 A1 | 5/2005 | Sakoda | |
| 2006/0187964 A1 | 8/2006 | Li et al. | |
| 2007/0025244 A1 | 2/2007 | Ayyagari et al. | |
| 2007/0041353 A1 | 2/2007 | Li et al. | |
| 2007/0076675 A1 | 4/2007 | Chen | |
| 2007/0160021 A1 | 7/2007 | Xhafa et al. | |
| 2007/0217378 A1 | 9/2007 | Moorti et al. | |
| 2007/0280246 A1 | 12/2007 | Berkman et al. | |
| 2007/0286222 A1 | 12/2007 | Balasubramanian | |
| 2008/0002641 A1* | 1/2008 | Hong | H04W 48/20 370/338 |
| 2008/0144558 A1 | 6/2008 | Wentink | |
| 2008/0146253 A1 | 6/2008 | Wentink | |
| 2008/0151814 A1 | 6/2008 | Jokela | |
| 2008/0219196 A1 | 9/2008 | Ptasinski | |
| 2008/0240049 A1 | 10/2008 | Gaur | |
| 2008/0247376 A1 | 10/2008 | Del Prado Pavon et al. | |
| 2008/0310391 A1 | 12/2008 | Schneidman et al. | |
| 2009/0010191 A1 | 1/2009 | Wentink | |
| 2009/0016306 A1 | 1/2009 | Wang et al. | |
| 2009/0052362 A1 | 2/2009 | Meier et al. | |
| 2009/0109887 A1 | 4/2009 | Chandra et al. | |
| 2009/0196163 A1 | 8/2009 | Du | |
| 2009/0196211 A1 | 8/2009 | Wentink | |
| 2009/0196212 A1 | 8/2009 | Wentink | |
| 2009/0219847 A1 | 9/2009 | Fischer | |
| 2010/0165973 A1 | 7/2010 | Su et al. | |
| 2010/0192001 A1 | 7/2010 | Cornwall et al. | |
| 2010/0278088 A1 | 11/2010 | Goldman | |
| 2010/0284316 A1 | 11/2010 | Sampathkumar | |
| 2010/0309831 A1 | 12/2010 | Yeh et al. | |
| 2010/0315999 A1 | 12/2010 | Kakani et al. | |
| 2011/0002219 A1 | 1/2011 | Kim et al. | |
| 2011/0026446 A1 | 2/2011 | Stacey | |
| 2011/0122780 A1 | 5/2011 | Nieminen et al. | |
| 2011/0176521 A1 | 7/2011 | Park et al. | |
| 2011/0268054 A1 | 11/2011 | Abraham et al. | |
| 2012/0106418 A1 | 5/2012 | Xhafa et al. | |
| 2012/0120858 A1 | 5/2012 | Das et al. | |
| 2012/0147800 A1 | 6/2012 | Park et al. | |
| 2012/0159001 A1 | 6/2012 | Liu et al. | |
| 2012/0201316 A1 | 8/2012 | Zhang et al. | |
| 2012/0219099 A1 | 8/2012 | Loukianov | |
| 2012/0263084 A1 | 10/2012 | Liu et al. | |
| 2012/0263085 A1 | 10/2012 | Liu et al. | |
| 2012/0263086 A1 | 10/2012 | Liu et al. | |
| 2012/0263094 A1 | 10/2012 | Wentink | |
| 2012/0302184 A1 | 11/2012 | Zaitsu | |
| 2012/0315943 A1 | 12/2012 | Chu et al. | |
| 2013/0114506 A1 | 5/2013 | Cai et al. | |
| 2013/0176902 A1 | 7/2013 | Wentink et al. | |
| 2013/0230028 A1 | 9/2013 | Calcev et al. | |
| 2013/0235792 A1 | 9/2013 | Abraham et al. | |
| 2013/0258931 A1 | 10/2013 | Gonikberg et al. | |
| 2014/0119268 A1 | 5/2014 | Chu et al. | |
| 2014/0153463 A1 | 6/2014 | Park et al. | |
| 2014/0153469 A1 | 6/2014 | Park et al. | |

FOREIGN PATENT DOCUMENTS

| | | |
|---|---|---|
| EP | 1777877 A2 | 4/2007 |
| WO | WO-2008111496 A2 | 9/2008 |
| WO | WO-2010/002100 A2 | 1/2010 |
| WO | WO-2012122119 A1 | 9/2012 |

OTHER PUBLICATIONS

Jafarian et al., "EDCA Parameters". Jul. 16, 2012.*
U.S. Appl. No. 14/875,597, Liu.
IEEE Std. 802.11-2012; IEEE Standard for Information technology—Telecommunications and information exchange between systems Local and metropolitan area networks—Specific requirements; Part 11: Wireless LAN Medium Access Control (MAC) and Physical Layer (PHY) Specifications; IEEE Computer Society; Sponsored by the LAN/MAN Standards Committee; Mar. 29, 2012; 2793 pages.
802.16-2009 IEEE Standard for Local and Metropolitan area networks; Part 16: Air Interface for Broadband Wireless Access Systems; IEEE Computer Society and the IEEE Microwave Theory and Techniques Society; Sponsored by the LAN/MAN Standard Committee; May 29, 2009; 2082 pages.
IEEE Std. 802.20-2008; IEEE Standard for Local and metropolitan area networks; Part 20: Air Interface for Mobile Broadband Wireless Access Systems Supporting Vehicular Mobility—Physical and Media Access Control Layer Specification; IEEE Computer Society; Sponsored by the LAN/MAN Standards Committee; Aug. 29, 2008; 1032 pages.
"Specification of the Bluetooth System," Master Table of Contents & Compliance Requirements—Covered Core Package version: 4.0; Jun. 30, 2010; 2302 pages.
IEEE P802.11ac/D5.0; Draft Standard for Information Technology—Telecommunications and information exchange between systems—Local and metropolitan area networks—Specific requirements: Part 11: Wireless LAN Medium Access Control (MAC) and Physical Layer (PHY) specifications: Amendment 4: Enhancements for Very High Throughput for Operation in Bands below 6 GHz; Jan. 2013; 440 pages.
IEEE Std. P802.11ad/D5.0; Draft Standard for information technology—Telecommunications and information exchange between systems Local and metropolitan area networks—Specific requirements; Part 11: Wireless LAN Medium Access Control (MAC) and Physical Layer (PHY) Specifications; Amendment 3: Enhancements for Very High Throughput in the 60 GHz Band; Sep. 2011; 601 pages.
IEEE P802.11ah/D1.0 Draft Standard for Information Technology—Telecommunications and Information Exchange Between Systems Local and Metropolitan Area Networks—Specific Requirements; Part 11: Wireless LAN Medium Access Control (MAC) and Physical Layer (PHY) Specifications; Amendment 6: Sub 1 GHz License Exempt Operation; Oct. 2013; 394 pages.
Office Action in U.S. Appl. No. 13/450,220, dated Oct. 6, 2015 (20 pages).
Notice of Allowance in U.S. Appl. No. 13/450,222, dated Aug. 21, 2015 (9 pages).
Supplemental Notice of Allowability in U.S. Appl. No. 13/450,222, dated Sep. 2, 2015 (3 pages).
Office Action in U.S. Appl. No. 13/450,220, dated Jun. 25, 2014 (18 pages).
Office Action in U.S. Appl. No. 13/450,220, dated Jan. 16, 2015 (17 pages).
Office Action in U.S. Appl. No. 13/450,222, dated Sep. 11, 2014 (19 pages).
Office Action in U.S. Appl. No. 13/450,222, dated Jan. 6, 2015 (21 pages).
IEEE P802.11v/D14.0—Draft Standard for Information Technology—Telecommunications and information exchange between systems—Local and metropolitan area networks—Specific Requirements—Part 11: Wireless LAN Medium Access Control (MAC) and Physical Layer (PHY) specifications; Amendment 8: IEEE 802.11 Wireless Network Management; Aug. 2010; 426 pages.
IEEE P802.11n: TGn Sync Proposal Technical Specifications; Syed Aon Mujtaba; IEEE 802.11-04/0889r6; May 2005; 131 pages.
Minyoung Park (Intel): "TGah SFD D12.x ; 11-13-0130-00-00ah-tgah-sfd -d12-x", IEEE SA Mentor; 11-13-0130-00-00AH-TGAH-SFD-D12-X, IEEE-SA Mentor, Piscataway, NJ USA, vol. 802.11ah, Jan. 16, 2013, pp. 1-58, XP068040532 [retrieved on Jan. 16, 2013] paragraph [4.4.1.1].
Van Nee, et al. "The 802.11n MIMO-OFDM Standard for Wireless LAN and Beyond," Wireless Personal Communications, vol. 37, pp. 445-453 (Jun. 2006).

(56) References Cited

OTHER PUBLICATIONS

IEEE P802.11ac/D2.0; Draft Standard for Information Technology—Telecommunications and information exchange between systems—Local and metropolitan area networks—Specific requirements; Part 11: Wireless LAN Medium Access Control (MAC) and Physical Layer (PHY) specifications; Amendment 4: Enhancements for Very High Throughput for Operation in Bands below 6 GHz; Prepared by the 802.11 Working Group of the 802 Committee; Jan. 2012; 359 pages.
IEEE P802.11ac/D2.1 Draft Standard for Information Technology—Telecommunications and information exchange between systems—Local and metropolitan area networks—Specific requirements, Part 11: Wireless LAN Medium Access Control (MAC) and Physical Layer (PHY) specifications, Amendment 4: Enhancements for Very High Throughput for Operation in Bands below 6 GHz, 802.11 Working Group of the 802 Committee, Mar. 2012, 363 pages.
Taghavi et al., "Introductory Submission for TGah", doc. No. IEEE 802.11-11/0062r0, Institute for Electrical and Electronics Engineers, pp. 1-5 (Jan. 14, 2011).
Zhang et al., "11ah Data Transmission Flow," The Institute of Electrical and Electronics Engineers, doc. No. IEEE 802.11-11/1484r1, (Nov. 2011); 15 Pages.
Park, "Proposed Specification Framework for TGah", The Institute of Electrical and Electronics Engineers, doc. No. IEEE 802.11-11/1137r6, Mar. 2012.
International Preliminary Patentability Report in corresponding PCT/US2012/034091 mailed Oct. 31, 2013.
International Search Report and Written Opinion in International Application No. PCT/US2012/034091 dated Nov. 27, 2012.
IEEE Std. 802.11b-1999 (Supplement to ANSI/IEEE Std. 802.11, 1999 Edition—96 pages) Supplement to IEEE Standard for Information Technology—Telecommunications and information exchange between systems—Local and metropolitan area networks—Specific requirements, Part 11: Wireless LAN Medium Access Control (MAC) and Physical Layer (PHY) specifications:96 Pages.
IEEE P802.11g/D8.2 Draft Supplement to Standard [for] Information Technology—Telecommunications and information exchange between systems—Local and metropolitan area networks—Specific requirements—Part 11: Wireless LAN Medium Access Control (MAC) and Physical Layer (PHY) specifications: Further Higher Data Rate Extension in the 2.4 GHz Band; Apr. 2003, 69 pages.
Gunnam, Kiran, Choi, Gwan, Wang, Weihuang; Mutli-Rate Layered Decoder Architecture for Block LDPC Codes of the IEEE 802.11n Wireless Standard; Department of Electrical and Computer Engineering; 2007; pp. 1645-1648.
PCT International Search Report and Written Opinion for related Application No. PCT/US2012/066246; Jan. 23, 2013; 5 pages.
Park, Miuyoung; IEEE P802.11; Jul. 2012; 32 pages.
Ghosh, Chittabrata et al.; Restricted Access Window Signaling for Uplink Channel Access; Jul. 16, 2012; 13 pages.
Liu, Siyang et al.; DCF Enhancements for Large Number of STAs; Sep. 15, 2011; 11 pages.
Revolution Wi-Fi The Wireless Professional's Connection for Independent Analysis; Wireless QoS Part 1—Background Information; Jul. 28, 2010; 11 pages.
Mangold, Stefan et al.; IEEE 802.11e Wireless LAN for Quality of Service; 2002; 8 pages.
IEEE Standard for Information technology—Telecommunications and information exchange between systems Local and metropolitan area networks—Specific requirements Part 11: Wireless LAN Medium Access Control (MAC) and Physical Layer (PHY) Specifications; Copyright © 2012 by The Institute of Electrical and Electronics Engineers, Inc.; Mar. 29, 2012; 2793 pages.
de Vegt, Rolf; Potential Compromise for 802.11ah Use Case Document; IEEE 802.11-11/0457r0; Mar. 2011; 27 pages.

IEEE Std. 802.11a-1999 (Supplement to IEEE Std. 802.11-1999) "Supplement to IEEE Standard for Information technology—Telecommunications and information exchange between systems—Local and metropolitan area networks—Specific requirements—Part11 : Wireless LAN Medium Access Control (MAC) and Physical Layer (PHY) specifications: High-Speed Physical Laver in the 5 GHZ Band," The Institute of Electrical and Electronics Engineers, Inc., (1999), 91 pages.
International Standard, ISO/IEC 8802-11, ANSI/IEEE Std. 802.11, "Information technology—Telecommunications and information exchange between systems—local and metropolitan area networks—specific requirements" Part 11: Wireless LAN Medium Access Control (MAC) and Physical Layer (PHY) specifications, The Institute of Electrical and Electronics Engineers, Inc., (1999), 531 pages.
IEEE Std. 802.11-2007 (revision of IEEE Std. 802.11-1999) "Information Standard for Information technology—Telecommunications and information exchange between systems—Local and metropolitan area networks—Specific requirements" Part 11: Wireless LAN Medium Access Control (MAC) and Physical Layer (PHY) Specifications, *The Institute of Electrical and Electronics Engineers, Inc.*, (Jun. 12, 2007), 1232 pages.
IEEE Std. 802.11n "IEEE Standard for Information Technology—Telecommunications and information exchange between systems—Local and metropolitan area networks—Specific requirements, Part 11: Wireless LAN Medium Access Control (MAC) and Physical Layer (PHY) Specifications: Amendment 5: Enhancements for Higher Throughput," *The Institute of Electrical and Electronics Engineers, Inc.*, Oct. 2009.
PCT International Search Report for related Application No. PCT/US2013/044473; Oct. 29, 2013; 5 pages.
Chen, "Home Network Basis: Transmission Environments and Wired/Wireless Protocols," Prentice Hall (Jul. 2003).
Hiertz, et al., "The IEEE 802.11 Universe," IEEE Communications Magazine, pp. 62-70, Jan. 2010.
Stacey et al., "IEEE P802.11, Wireless LANs, Proposed TGac Draft Amendment," Institute of Electrical and Electronics Engineers, doc. No. IEEE 802.11-10/1361r3 (Jan. 2011), 154 pages.
Stacey et al., "Specification Framework for TGac," document No. IEEE 802.11-09/0992r20, Institute for Electrical and Electronics Engineers, pp. 1-49, Jan. 18, 2011.
Perahia, et al., "Gigabit Wireless LANs: an overview of IEEE 802.11 ac and 80211 ad," ACM SIGMOBILE Mobile Computing and Communications Review, vo. 15, No. 3, pp. 23-33, Jul. 2011.
IEEE Std. 802.11af/D1.05 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: TV White Spaces Operation," The Institute of Electrical and Electronics Engineers, Inc., Nov. 2011.
Yu, et al. "Coverage extension for IEEE802.11 ah," The Institute of Electrical and Electronics Engineers, doc. No. IEEE 802.11-11/0035r1, (Jan. 2011).
Vermani, et al. "Preamble Format for 1 MHz," The Institute of Electrical and Electronics Engineers, doc. No. IEEE 802.11-11/1482r2, (Nov. 2011).
Zhang et al., "1MHz Waveform in Wider BW", The Institute of Electrical and Electronics Engineers, doc. No. IEEE 802.11-12/0309r1, (Mar. 2012).
Vermani, et al. "Spec Framework Text for PHY Numerology," The Institute of Electrical and Electronics Engineers, doc. No. IEEE 802.11-11/1311rO, (Sep. 2011).
Minyoung Park et al., Low Power Capability Support for 802.11ah dated Jan. 17, 2011, 7 pages.
U.S. Appl. No. 61/475,776 dated Apr. 15, 2011.
Zhao, Liqiang et al.; Hybrid DCF Supporting Hybrid Antennas in a WLAN; IMACS Multiconference; Oct. 4-6, 2006.

(56) References Cited

OTHER PUBLICATIONS

ANSI/IEEE Std 802.11, 1999 Edition; Information technology—Telecommunications and information exchange between systems—Local and metropolitan area networks—Specific requirements—Part 11: Wireless LAN Medium Access Control (MAC) and Physical Layer (PHY) Specifications; LAN/MAN Standards Committee of the IEEE Computer Society; 528 pages.

Park, Minyoung. "IEEE P802.11 Wireless LANs Proposed Specification Framework for TGah." TGac Spec Framework. 13 pages. Mar. 12, 2012.

Notification of Transmittal of The International Search Report and The Written Opinion of The International Searching Authority, or The Declaration dated Jan. 28, 2014 in reference to PCT/US2013/043593 (10 pages).

* cited by examiner

802.11AH DUTY CYCLE BASED CHANNEL ACCESS PRIORITIES

CROSS-REFERENCE TO RELATED APPLICATIONS

This application claims the benefit of U.S. Provisional Application No. 61/683,385, filed on Aug. 5, 2012 and U.S. Provisional Application No. 61/791,827, filed Mar. 15, 2013.

The present disclosure is related to U.S. patent application Ser. No. 13/450,209, filed on Apr. 18, 2012, U.S. patent application Ser. No. 13/680,831, filed on Nov. 19, 2012, and U.S. patent application Ser. No. 13/680,876, filed on Nov. 19, 2012. The entire disclosures of the applications referenced above are incorporated herein by reference.

FIELD

The present disclosure relates to client station access priorities in wireless local area networks.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

In a wireless local area network (WLAN), one or more client stations may compete for access to the WLAN via an access point (AP). The AP selectively grants access to the client stations based on a variety of factors, including, but not limited to, respective access priorities of the client stations. For example, the AP selectively grants access to a first client station prior to granting access to a second client station if the first client station has a higher access priority than the second client station.

For example, the first client station may have limited available power as compared to the second client station (e.g., the first client station may rely on battery power while the second client station has access to a wired power source). Alternatively, the first client station and the second client station may each rely on battery power, but the battery of the first client station may have a smaller capacity than a battery of the second client station, or a remaining capacity of the first client station may be significantly less than a remaining capacity of the second client station. Accordingly, the first client station may request (and/or the AP may assign) a higher access priority for the first client station.

SUMMARY

A system includes an access point and a client station. The access point is configured to control access to a communication channel of a wireless network, define a first power category and at least one second power category, each of the first power category and the at least one second power category having a respective access priority associated with access to the communication channel, and communicate a requirement for assignment to the first power category. The client station is configured to determine whether an operating characteristic of the client station meets the requirement for assignment to the first power category, and transmit, in response to a determination that the operating characteristic meets the requirements, a request to the access point to be assigned to the first power category. A method includes, using an access point, controlling access to a communication channel of a wireless network, defining a first power category and at least one second power category, each of the first power category and the at least one second power category having a respective access priority associated with access to the communication channel, and communicating a requirement for assignment to the first power category. The method further includes, using a client station, determining whether an operating characteristic of the client station meets the requirement for assignment to the first power category, and transmitting, in response to a determination that the operating characteristic meets the requirements, a request to the access point to be assigned to the first power category.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

In the drawings, reference numbers may be reused to identify similar and/or identical elements.

DESCRIPTION

Figure 1:
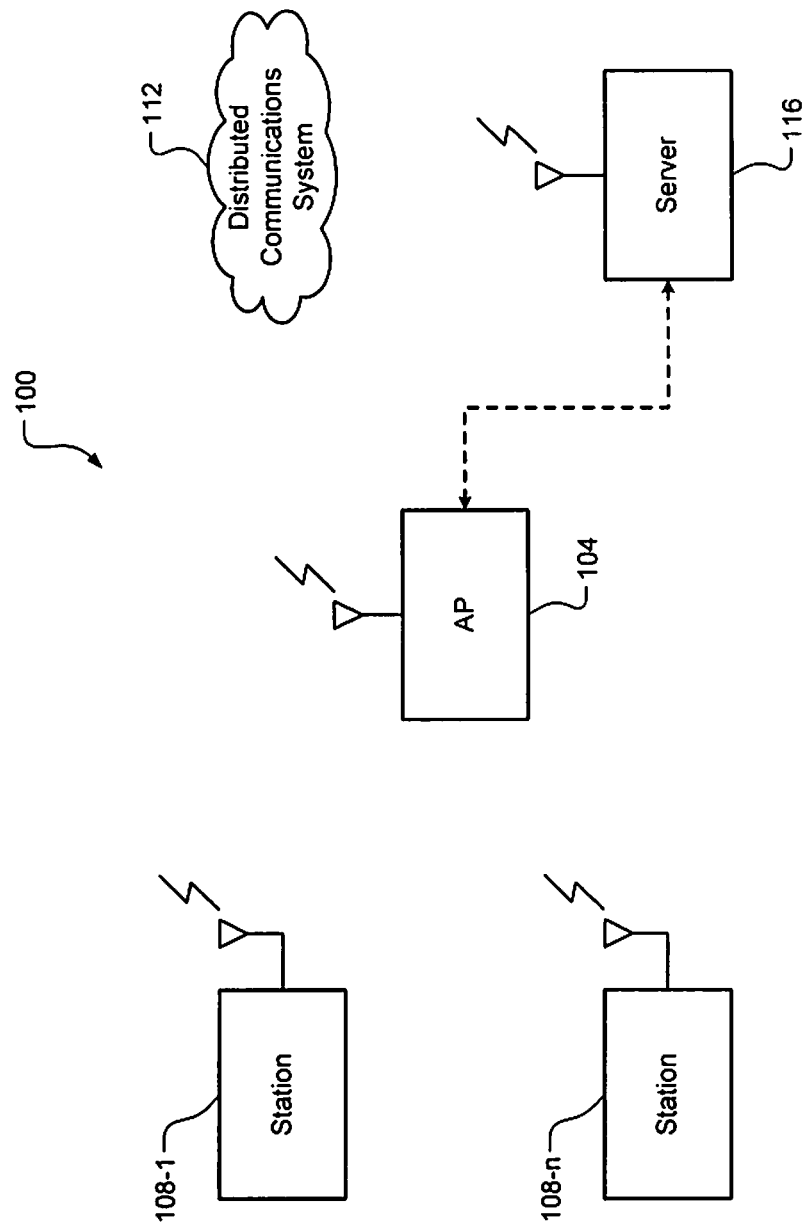
FIG. 1 is a functional block diagram of an example channel access priority system according to the principles of the present disclosure.

An access point (AP) operating in a wireless local area network (WLAN), such as a WiFi, long range WiFi, or other suitable network type, provides a communication interface between devices in the WLAN. For example, the devices may include one or more client stations communicating with one another, the AP, and/or a distributed communications system (DCS) such as the Internet. For example, the AP operates in a WLAN according to 802.11ah protocol.

The devices may compete with one another for access to a communication channel associated with communicating in the WLAN. For example, each device may wait a predetermined time (e.g., a backoff time) after detecting activity on the channel prior to attempting to communicate on the channel. Multiple devices compete for access to the channel in a period referred to as a contention period. For example, the backoff times may be preassigned to the devices and/or the backoff times may be randomly determined in each contention period. Example contention period and backoff time operation is described in, for example, U.S. patent application Ser. No. 13/450,209 filed on Apr. 18, 2012, U.S. patent application Ser. No. 13/680,831, filed Nov. 19, 2012, and U.S. patent application Ser. No. 13/680,876, filed Nov. 19, 2012.

The AP may assign the backoff times to the devices according to respective access priorities. For example, the WLAN may have a plurality of access priorities each associated with a different backoff time. For example, higher access priorities are associated with lower backoff times, and lower access priorities are associated with higher backoff times. Accordingly, each device accesses the communication channel according to a backoff time associated with a corresponding access priority. A device having a higher access priority is granted access relatively earlier in each contention period, allowing the device to conserve power. Conversely, a device having a lower access priority is granted access relatively later in each contention period. Consequently, devices having a lower access priority consume more power while waiting for an opportunity to access the communication channel during the contention period.

A channel access priority system according to the principles of the present disclosure may include devices implementing low power sensor applications and/or cellular (e.g., 3G or 4G) data offloading applications. The devices may need to conserve power (e.g., battery power) for performing functions related to these applications. Accordingly, the devices implementing these applications may request and/or be assigned or granted a higher access priority than devices that do not implement these applications. Alternatively, devices implementing these applications that have less remaining battery power may be assigned a higher access priority than others of these devices that have more remaining battery power. In this manner, devices that need to conserve battery power do not consume as much power waiting to access the communication channel.

Accordingly, for any device having limited access to power (e.g., mobile devices operating on battery power), having a higher access priority is desirable. Indeed, every device operating in the WLAN will prefer a higher access priority and may therefore request a higher access priority. However, even among such devices, some of the devices may have a greater need for higher access priority. For example, a first device may need to conserve power to implement sensor applications while having little remaining battery power. Conversely, a second device may implement cellular data offloading applications. Accordingly, the first device may require a higher access priority than the second device.

The channel access priority system according to the principles of the present disclosure is configured to determine which devices requesting a higher access priority should be granted the higher access priority. For example, a device may request the higher access priority while operating in a manner that is inconsistent with conserving battery power. The AP (or another component of the channel access priority system) may determine that one or more operating characteristics of the device indicate that the device should not be granted higher access priority. For example, the operating characteristics may include, but are not limited to, an expected idle/sleep interval of the device, a duty cycle of the device, lengths of active periods of the device, and/or communication channel access frequency of the device.

FIG. 1 shows a channel access priority system 100 including an AP 104, a plurality of client stations 108-1 . . . 108-n, referred to collectively as client stations 108, and a distributed communications system (DCS) 112. The system 100 has two or more power categories associated with respective ones of the client stations 108. Each of the power categories is associated with a respective channel access priority. For example, the power categories may include a high power category and a low power category. The high power category is associated with a low access priority. Conversely, the low power category is associated with a high access priority. Further, the low access priority may be associated with a longer backoff time, while the high access priority is associated with a shorter backoff time. The shorter backoff time allows a client station 108 having the high access priority to access the communication channel sooner in each contention period.

For example, the AP 104 may announce that the system 100 has different power categories (e.g., in a beacon transmitted to the client stations 108). The AP 104 may also announce minimum conditions (e.g., operating characteristics of the client stations 108) that must be met by the client stations 108 in order to qualify for a low power category. The minimum conditions may include, but are not limited to, a maximum duty cycle, a minimum sleep interval, a minimum sleep interval with a maximum active period, a minimum sleep interval with a default or fixed active period, and/or a maximum communication channel access frequency (e.g., a maximum number of times per a predetermined period).

Each of the client stations 108 may request one of the power categories (e.g., the low power category) based on the announced minimum conditions. For example, the client stations 108 may transmit a request to be assigned one of the power categories during or after association with the AP 104. The request includes information indicating whether the client station 108 meets the minimum conditions for the requested power category. For example, the request may include an expected maximum duty cycle, and expected idle/sleep interval, an average or maximum active period for each access to the communication channel, and/or any other criteria related to the announced minimum conditions.

The AP 104 may accept or reject the request to be assigned the low power category based on the information in the request. For example, one of the client stations 108 may request the low power category even if the client station 108 does not meet the announced minimum conditions. In some situations, the AP 104 may accept the request despite the client station 108 not meeting the announced minimum conditions. For example, the AP 104 may determine that none of the client stations 108 operating in the system 100 meet the announced minimum conditions and therefore grant requests of selected ones of the client stations 108.

Further, a client station 108 may qualify for the low power category but decide not to request the low power category. For example, the client station 108 may not require access to the communication channel often enough to need the low power category. Or, the client station 108 may have sufficient battery power remaining to not need a high access priority. In still other situations, the client station 108 may decide not to request the low power category based on an amount of data to be transmitted by the client station 108.

Alternatively, another component of the system 100 (e.g., a server 116 or the DCS 112) may instruct the AP 104 to accept or reject the request. For example, the server 116 may be configured to monitor the duty cycles and/or other operating characteristics of the client stations 108 to determine whether one of the client stations 108 qualifies for the low power category. If the server 116 determines, from the operating characteristics, that one or more of the client stations 108 are not operating within the allowed constraints of the low power category, the server 116 may inform the AP 104 that the corresponding client station 108 does not qualify for the low power category. Alternatively (or additionally), the server 116 may inform the client station 108 that the client station 108 must adjust its operating characteristics to be within the allowed constraints (e.g., within a predetermined period) or be removed from the low power category.

For example, the client station 108-1 may request to be assigned to the low power category. The AP 104 may inform the server 116 when any of the client stations 108 requests to be assigned to the low power category, and/or any request may be transmitted from the client stations 108 to the server 116. The server 116 may determine that the client station 108-1 is operating at a duty cycle that is greater than the maximum duty cycle announced by the AP 104. Accordingly, the server 116 informs the AP 104 and/or the client station 108-1 to decrease its duty cycle below the maximum duty cycle or be rejected from the low power category. The client station 108-1 may be given a predetermined amount of time to adjust its duty cycle and/or may transmit another request after adjusting the duty cycle. Further, if the client station 108-1 is accepted into the low power category, the server 116 may continue to monitor the client station 108-1 to ensure that the duty cycle (and other operating characteristics) of the client station 108-1 remains within the constraints of the low power category.

Figure 2:
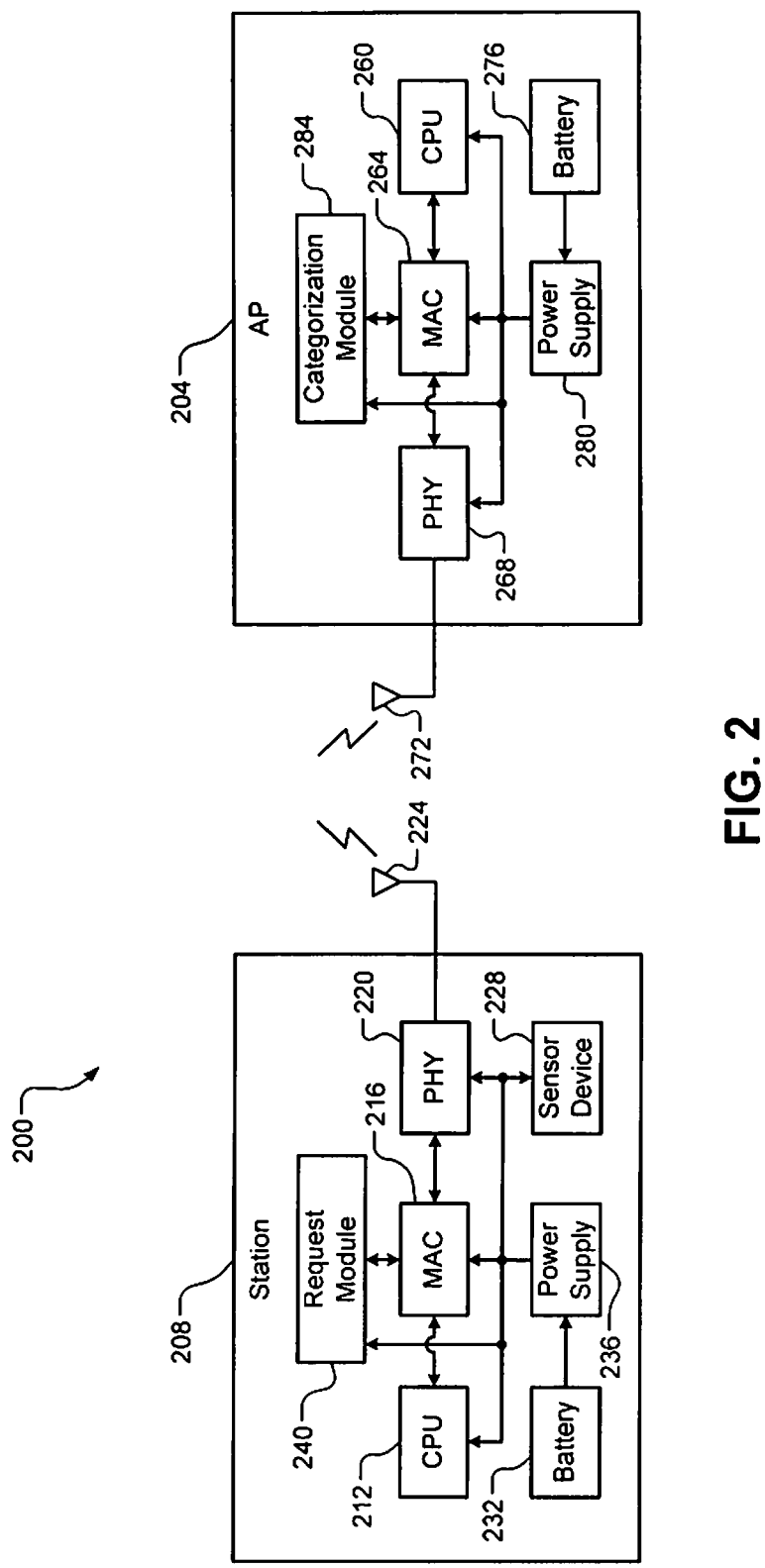
FIG. 2 is a functional block diagram showing the example channel access priority system according to the principles of the present disclosure in further detail.

FIG. 2 shows an example channel access priority system 200 including an AP 204 and a client station 208 (e.g., a mobile device such as a smartphone or tablet computer). Although only one client station 208 is shown, it is to be understood that the client station 208 may be one of a plurality of client stations. The client station 208 includes, for example, a processor (CPU) 212, a media access controller (MAC) 216, and a physical layer device (PHY) 220. The MAC 216 controls communication of data via the PHY 220 and an antenna 224. The client station 208 may include a sensor device 228. For example, the sensor device 228 may include, but is not limited to, an accelerometer, a gyrometer, and/or any other sensor device associated with the operation of the client station 208.

The client station 208 includes a battery 232 that provides power to the components of the client station 208. A power supply 236 distributes the power provided by the battery 232 to the components of the client station 208.

The client station 208 includes a request module 240. The request module 240 communicates with the MAC 216 to request to be assigned to, for example, a low power category. For example, the AP 204 may announce (e.g., in a beacon transmitted to the client station 208) different power categories and/or minimum criteria associated with the different power categories. The request module 240 may determine that the client station 208 qualifies for the low power category and generate a request accordingly. For example, the request module 240 may monitor operating characteristics of the client station 208 (e.g., a duty cycle, an average or maximum active period of the client station 208, a minimum sleep interval of the client station 208, etc.) and determine whether the client station 208 qualifies for the low power category accordingly. For example, determination of the duty cycle of the client station 208 may include, but is not limited to, a current duty cycle of the client station 208 and/or an expected (e.g., predicted) duty cycle of the client station 208.

The request module 240 generates a request for a desired one of the power categories based on the monitored operating characteristics of the client station 208. Further, the request module 240 may generate the request even if the operating characteristics of the client station 208 do not qualify for the low power category. For example, the request module 240 may generate a request based in part on the remaining battery level of the battery 232. For example, the request module 240 may generate the request regardless of other operating characteristics if the battery level is less than a predetermined threshold (e.g., 20% of the capacity of the battery 232).

The request module 240 may also generate further requests to transition between power categories. For example, the request module 240 may determine that an expected duty cycle will exceed the maximum duty cycle associated with the low power category and therefore request to be reassigned to the high power category. Conversely, if the request module 240 is currently in the high power category, the request module 240 may determine that an expected duty cycle will be less than the maximum duty cycle associated with the low power category and request to be reassigned to the low power category. This determination of whether the client station 208 should be reassigned to a different power category can also be performed by the AP 204 or another component of the system 200 (e.g., the server 116 of FIG. 1).

The request module 240 may determine a desired power category of the client station 208 periodically or in response to various conditions and generate a request accordingly. For example, the request module 240 may selectively generate the request to be assigned a particular power category upon each wake-up (i.e., where "wake-up" corresponds to a device transitioning from a sleep/idle or inactive mode/interval to an awake/active mode/interval to access the communication channel).

The AP 204 includes, for example, a processor (CPU) 260, MAC 264, and PHY 268. The MAC 264 controls communication of data via the PHY 268 and an antenna 272. If the AP 204 is a mobile device, the AP 204 may include a battery 276 that provides power to the components of the AP 204. Alternatively, the AP 204 may be connected to a wired power source such as a wall outlet (not shown). A power supply 280 distributes the power provided by the battery 276 or other power source to the components of the AP 204.

The AP 204 includes a categorization module 284. The categorization module 284 defines power categories (and associated access priorities and backoff times) and communicates with the MAC 264 to announce the power categories (e.g., via a transmitted beacon) and selectively reject and accept quests by the client station 208 to be assigned one of the power categories. For example, the categorization module 284 receives requests in the client station 208 and determines whether the client station 208 should be accepted in a requested power category accordingly. For example, the request may include an indication of whether the client station 208 qualifies for the requested power category. The indication may simply be a binary indicator of whether the client station 208 qualifies for the requested power category.

Alternatively, the indication may include one or more operating characteristics of the client station 208. The categorization module 284 may compare the operating characteristics to any required minimum or maximum characteristics (e.g., duty cycle) associated with the requested power category. For example, the beacon or another message transmitted by the AP 204 during association may include the required characteristics and/or merely an indication that the client station 208 should include data regarding certain characteristics with any request. In other words, rather than relying upon the client station 208 to reliably determine whether the request is valid, the categorization module 284 itself determines whether to grant the request.

The categorization module 284 may also reject or accept the request based on other factors unrelated to operating characteristics of the client station 208. For example, the categorization module 284 may reject or accept the request based on network conditions (e.g., a number of client stations, load, traffic, etc.) and/or network environment (e.g., a condition of the communication channel, interference, etc.). Accordingly, the categorization module 284 may determine that the client station 208 qualifies for the low power category, but nonetheless reject the request of the client station 208 due to network conditions. For example, the categorization module 284 may reject the request if network traffic is above a predetermined threshold and/or signal quality is below a predetermined threshold.

If the client station 208 needs to transmit data (i.e., upload data via the AP 204), the request module 240 determines whether to request the low power category based on, for example, an amount of data (e.g., queued data) that needs to be transmitted in the next active period. For example, the request module 240 estimates an amount of time needed to transmit the queued data. If the amount of time requires the client station 208 to exceed the maximum duty cycle limit, then the request module 240 requests the high power category. Conversely, if the amount of time does not require the client station 208 exceed the maximum duty cycle limit, then the request module 240 requests the low power category. The request module 240 may also simply compare the amount of data to a predetermined threshold and request the low power category if the amount of data is less than the predetermined threshold.

Further, if additional data is queued for transmission while the client station 208 is operating according to the low power category, the request module 240 may determine that the client station 208 should be transitioned to the high power category. In other words, the amount of data may initially be below the predetermined threshold, but additional data may be queued causing the total amount of data to exceed the predetermined threshold. Accordingly, the request module 240 may generate a request to transition to the high power category.

Although this example corresponds to the duty cycle, those skilled in the art can appreciate that the request module 240 is configured to monitor any of the operating characteristics of the client station 208 associated with the low power category to determine which of the power categories to request. For example, the request module 240 may estimate the duty cycle of the client station 208 based on an average sleep interval over a predetermined number of previous wake-up events, or simply based on a length of the last sleep interval.

Conversely, if the client station 208 needs to receive data (i.e., download data via the AP 204), the categorization module 284 determines whether to assign the low power category the client station 208 based on, for example, an amount of data (e.g., queued data) to be transmitted to the client station 208 in the next active period. For example, the categorization module 284 estimates an amount of time needed to transmit the queued data to the client station 208. If the amount of time requires the client station 208 to exceed the maximum duty cycle limit, then the categorization module 284 assigns the high power category. Conversely, if the amount of time does not require the client station 208 exceed the maximum duty cycle limit, then the categorization module 284 assigns the low power category. The categorization module 284 may also simply compare the amount of data to a predetermined threshold and assign the low power category if the amount of data is less than the predetermined threshold.

Further, if additional data is queued for transmission to the client station 208 while the client station 208 is operating according to the low power category, the categorization module 284 may determine that the client station 208 should be transitioned to the high power category. In other words, the amount of data may initially be below the predetermined threshold, but additional data may be queued causing the total amount of data to exceed the predetermined threshold. Accordingly, the categorization module 284 may reassign the client station 208 to the high power category.

In other words, as described above, the request module 240 may be responsible for determining whether the client station 208 qualifies for the low power category while transmitting data from the client station 208. Conversely, the categorization module 284 may be responsible for determining whether the client station 208 qualifies for the low power category while the client station 28 is receiving data from the AP 204.

Although the AP 204 is described as including the categorization module 284, those skilled in the art can appreciate that another component of the system 200, such as the server 116 as shown in FIG. 1, may include the categorization module 284 instead of or in addition to the AP 204. Accordingly, the server 116 may monitor the operating characteristics of the client station 208 to determine whether the client station 208 should be assigned to the low power category. The server 116 may inform the AP 204 whether to accept or reject requests from the client station 208.

Figure 3:
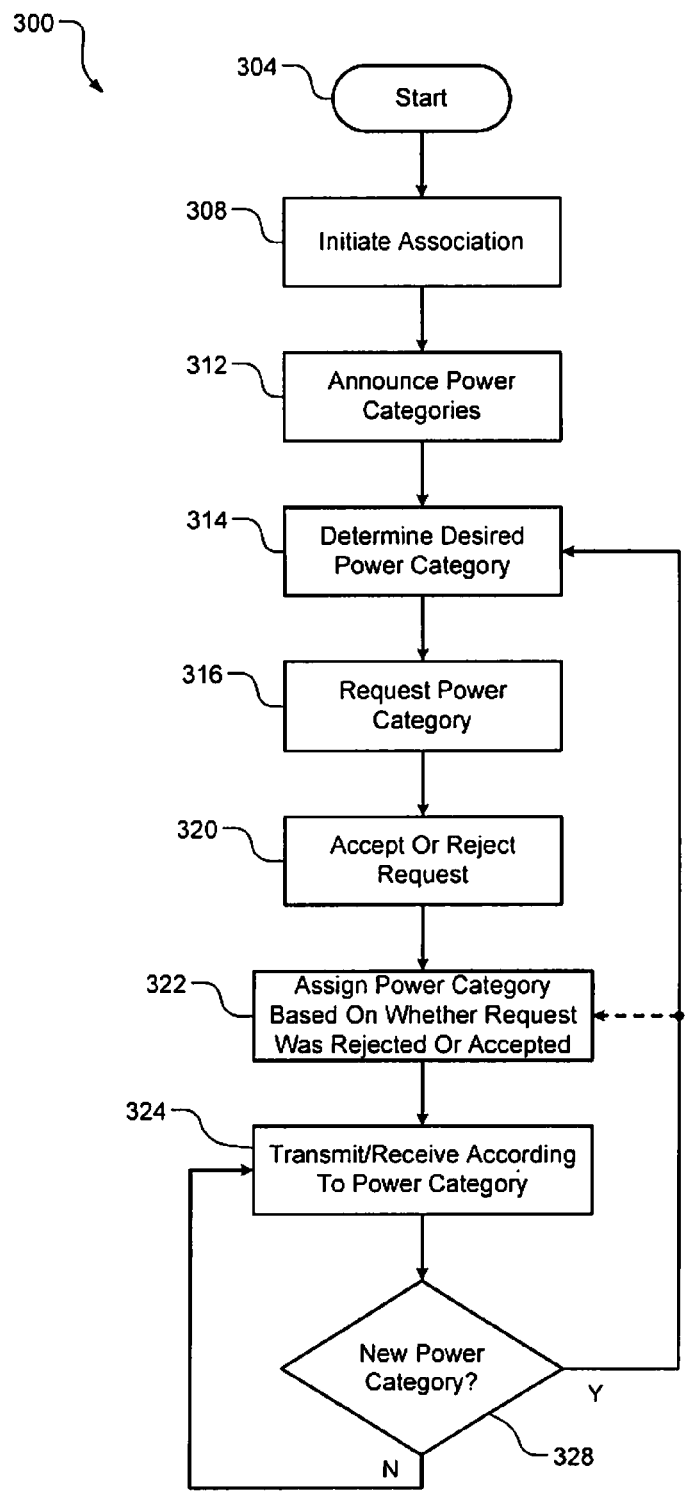
FIG. 3 is a flow diagram illustrating an example channel access priority method according to the principles of the present disclosure.

FIG. 3 shows an example channel access priority method 300 beginning at 304. At 308, a client station initiates association with an AP. At 312 (which may occur during or after association), the AP provides information regarding available power categories to the client station. The information may also include required operating characteristics for qualifying for respective ones of the power categories. At 314, the client station determines which power category is the desired power category for the client station. At 316, the client station requests to be assigned to the desired power category. At 320, the AP determines whether to accept or reject the request based on, for example, operating characteristics of the client station and/or network conditions. At 322, the AP assigns the client station to a power category according to whether the request was rejected or accepted. At 324, the client station transmits and/or receives data according to the assigned power category. At 328, the client station or the AP determines, yes or no, whether the client station should be assigned to a new power category (e.g., based on changed operating characteristics of the client station). If yes, the method 300 continues to 314 for the client station to determine a new desired category (or, if the AP determines that the client station should be assigned to a new power category, then the AP assigns the client station to the new power category at 322). If no, the client station, at 324, continues to transmit and/or receive data according to the assigned power category.

The wireless communications described in the present disclosure can be conducted in full or partial compliance with IEEE standard 802.11-2012, IEEE standard 802.16-2009, IEEE standard 802.20-2008, and/or Bluetooth Core Specification v4.0. In various implementations, Bluetooth Core Specification v4.0 may be modified by one or more of Bluetooth Core Specification Addendums 2, 3, or 4. In various implementations, IEEE 802.11-2012 may be supplemented by draft IEEE standard 802.11ac, draft IEEE standard 802.11ad, and/or draft IEEE standard 802.11ah.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

In this application, including the definitions below, the term module may be replaced with the term circuit. The term module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term code, as used above, may include software, firmware, and/or microcode, and may refer to programs, routines, functions, classes, and/or objects. The term shared processor encompasses a single processor that executes some or all code from multiple modules. The term group processor encompasses a processor that, in combination with additional processors, executes some or all code from one or more modules. The term shared memory encompasses a single memory that stores some or all code from multiple modules. The term group memory encompasses a memory that, in combination with additional memories, stores some or all code from one or more modules. The term memory may be a subset of the term computer-readable medium. The term computer-readable medium does not encompass transitory electrical and electromagnetic signals propagating through a medium, and may therefore be considered tangible and non-transitory. Non-limiting examples of a non-transitory tangible computer readable medium include nonvolatile memory, volatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

What is claimed is:

1. A system, comprising:
an access point configured to i) control access to a communication channel of a wireless network, ii) define a first power category and at least one second power category, each of the first power category and the at least one second power category having a respective access priority associated with access to the communication channel, and iii) communicate a requirement for assignment to the first power category as defined by the access point; and
a client station configured to i) determine whether an operating characteristic of the client station meets the requirement for assignment to the first power category as defined by the access point, and ii) transmit, in response to a determination that the operating characteristic meets the requirement, a request to the access point to be assigned to the first power category,
wherein the access point is further configured to, based on whether the operating characteristic meets the requirement for assignment to the first power category, accept or reject the request.

2. The system of claim 1, wherein the access point is configured to assign the client station to one of the first power category and the at least one second power category based on whether the request is accepted or rejected.

3. The system of claim 1, wherein the requirements for assignment include a predetermined threshold for the operating characteristic of the client station.

4. The system of claim 1, wherein the operating characteristic includes at least one of a duty cycle of the client station, a sleep interval of the client station, and a communication channel access frequency of the client station.

5. The system of claim 1, wherein the first power category is a lower power category than the at least one second power category.

6. The system of claim 1, wherein the respective access priorities include a first access priority associated with the first power category and a second access priority associated with the at least one second power category, and wherein the first access priority is higher than the second access priority.

7. The system of claim 1, wherein the respective access priorities correspond to respective backoff times.

8. The system of claim 1, wherein the access point is configured to selectively accept or reject the request regardless of whether the operating characteristic of the client station meets the requirement for assignment to the first power category.

9. The system of claim 1, wherein the request includes an indication of the operating characteristic of the client station.

10. The system of claim 1, wherein the access point is configured to i) monitor the operating characteristic of the client station, ii) determine whether the operating characteristic of the client station meets the requirement for assignment to the first power category, and iii) assign the client station to one of the first power category and the at least one second power category based on the determination of whether the operating characteristic of the client station meets the requirement for assignment to the first power category.

11. A method, comprising:
using an access point,
controlling access to a communication channel of a wireless network,
defining a first power category and at least one second power category, each of the first power category and the at least one second power category having a respective access priority associated with access to the communication channel, and
communicating a requirement for assignment to the first power category as defined by the access point;
using a client station,
determining whether an operating characteristic of the client station meets the requirement for assignment to the first power category as defined by the access point, and
transmitting, in response to a determination that the operating characteristic meets the requirement, a request to the access point to be assigned to the first power category; and
using the access point, accepting or rejecting the request based on whether the operating characteristic meets the requirement for assignment to the first power category.

12. The method of claim 11, further comprising:
assigning the client station to one of the first power category and the at least one second power category based on whether the request is accepted or rejected.

13. The method of claim 11, wherein the requirements for assignment include a predetermined threshold for the operating characteristic of the client station.

14. The method of claim 11, wherein the operating characteristic includes at least one of a duty cycle of the client station, a sleep interval of the client station, and a communication channel access frequency of the client station.

15. The method of claim 11, wherein the first power category is a lower power category than the at least one second power category.

16. The method of claim 11, wherein the respective access priorities include a first access priority associated with the first power category and a second access priority associated with the at least one second power category, and wherein the first access priority is higher than the second access priority.

17. The method of claim 11, wherein the respective access priorities correspond to respective backoff times.

18. The method of claim 11, further comprising selectively accepting or rejecting the request regardless of whether the operating characteristic of the client station meets the requirement for assignment to the first power category.

19. The method of claim 11, wherein the request includes an indication of the operating characteristic of the client station.

20. The method of claim 11, further comprising:
using the access point,
 monitoring the operating characteristic of the client station,
 determining whether the operating characteristic of the client station meets the requirement for assignment to the first power category, and
 assigning the client station to one of the first power category and the at least one second power category based on the determination of whether the operating characteristic of the client station meets the requirement for assignment to the first power category.

* * * * *